United States Patent [19]
Neukötter

[11] Patent Number: 5,736,639
[45] Date of Patent: Apr. 7, 1998

[54] TESTING DEVICE FOR BALE TYING

[75] Inventor: Alois Neukötter, Beelen, Germany

[73] Assignee: Claas KGaA, Harsewinkel, Germany

[21] Appl. No.: 654,379

[22] Filed: May 28, 1996

[30] Foreign Application Priority Data

Jun. 7, 1995 [DE] Germany .................. 195 20 762.9

[51] Int. Cl.$^6$ .................................................. A01D 59/04
[52] U.S. Cl. ................................ 73/432.1; 289/18.1
[58] Field of Search ............................ 73/865.9, 432.1; 289/2, 18.1

[56] References Cited

U.S. PATENT DOCUMENTS 4,753,464  6/1988  Jackson .................................. 289/2

FOREIGN PATENT DOCUMENTS 294078  12/1992  European Pat. Off. .

Primary Examiner—Robert Raevis
Attorney, Agent, or Firm—Michael J. Striker

[57] ABSTRACT

A testing device for tying a yarn loop on an agricultural bale forming machine having a bale forming chamber, has a sensor finger extendable transversely into a first passageway of an initial portion of a loop before a knotting step and also into a second passageway of a finished loop after the knotting step and holding the initial portion of the loop and the loop differently in different directions, an electrical switch movable to a switching-over position when the sensor finger is actuated so as to deviate by the loop because of the bale ejecting movement, the sensor finger having an end region formed as a spring which holds a passage of the initial portion of the loop deviatingly and during deviation of the electrical contact is at least indirectly switchingly actuated by the loop.

27 Claims, 4 Drawing Sheets

TESTING DEVICE FOR BALE TYING

BACKGROUND OF THE INVENTION

The present invention relates to a testing device for tying yarn loops, in particular for agricultural bale forming machines.

It is known to arrange a testing device on a bale forming chamber. In this construction a sensor finger extends transversely into one passageway of an initial portion of a loop before a knotting step, as well as into another passageway of a finished loop after the knotting step. The sensor finger of the initial portion of the loop and of the loop is held correspondingly in different directions which deviate from one another and therefore an electric switch is brought to a switching position when the sensor finger is actuated by the loop as a result of a bale ejection movement in a different manner.

Such an arrangement is disclosed for example in the European patent document EP 0 294 078 B1. In this device a rigid sensor finger is located in the initial position transversely over a housing gap of the bale storage chamber. Through this gap, before binding of the knot, the binding yarn applied around the bale is removed from the housing gap by a needle and supplied into the knotting device. The spring bias sensor finger is lifted from the binding yarn around a first turning bearing having an axis which extends parallel to the housing gap and supplies the binding yarn further, and then is turned back by a holding dish down spring to engage through the produced binding yarn loop. After the knotting step during a further expelling of the bale, the finished binding yarn loop pulls the sensor pin in the transporting direction of the bale, and the sensor finger together with an electrical contact device is turned against a restoring spring around a second turning bearing until a second secure electrical contact switching position is obtained, and thereafter the yarn loop is removed from the sensor pin. The time point of the contact switching over is compared with a transport position message of the bale transport produced at another location, and in the event of failing contact switching over resulting from a deficient yarn loop and/or knot, an alarm signal is produced. This device has a rigid finger with two turning bearings and two springs for the turning.

SUMMARY OF THE INVENTION

Accordingly, it is an object of the present invention to provide a testing device for bale tying, which has a simpler construction.

In keeping with these objects and with others which will become apparent hereinafter, one feature of the present invention resides, briefly stated, in an device in which the sensor finger of the end region is a spring which is deflectably held in the passage of the initial portion of the loop and, being pulled by the loop, is directly or indirectly switchingly actuated during a deflection of the electrical contacts.

When the device is designed in accordance with the present invention, it eliminates the disadvantages of the prior art and provides for the highly advantageous results in substantial simplification of the testing device.

In accordance with one embodiment of the present invention only a spring and the contact are provided, while in accordance with another embodiment moreover a single turning bearing is provided, namely for the contact transmitter device. The single spring is the sensor finger and provides both the restoring spring function as well as the sensor function, and also the function of holding down. More than half of the components of the sensor assembly group are therefore dispensed with.

In accordance with a second embodiment of the invention, the spiral spring can extend through a slot-like driver of a turning plate of the contact device. It extends from there so that it is slightly curved as a hook to form the sensor finger over the housing gap. Thereby the binding yarn loop is provided with a reliable holding in the hook region until the turning of the turning plate through the safe contact transmitting position is performed.

The driver extends from the turning plate outwardly and inclined in the direction of the winding course of the spiral spring. The slot provided in the driver is limited at an end site, so that the spring finds there an abutment when its blocked end during pulling of the binding yarn is lifted by the needle over the housing gap. Thereby the torsion loading at the inner clamping end of the spiral spring is limited. Moreover, the so inclined driver forms a guiding surface for the falling down finished loop. This guiding surface is arranged at the other side of the housing gap opposite to a funnel shaped inclined guiding wall for the loop inlet, which covers the narrowest distance region from the sensor finger and about 0.5–1 cm. Therefore in the beginning the loose loop is caught safely by the sensor finger and not pulled under it.

The whole sensor assembly group, including the electrical switch, is mounted on a support plate and can be fixed in two elongated holes in an optimal position relative to the housing gap.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
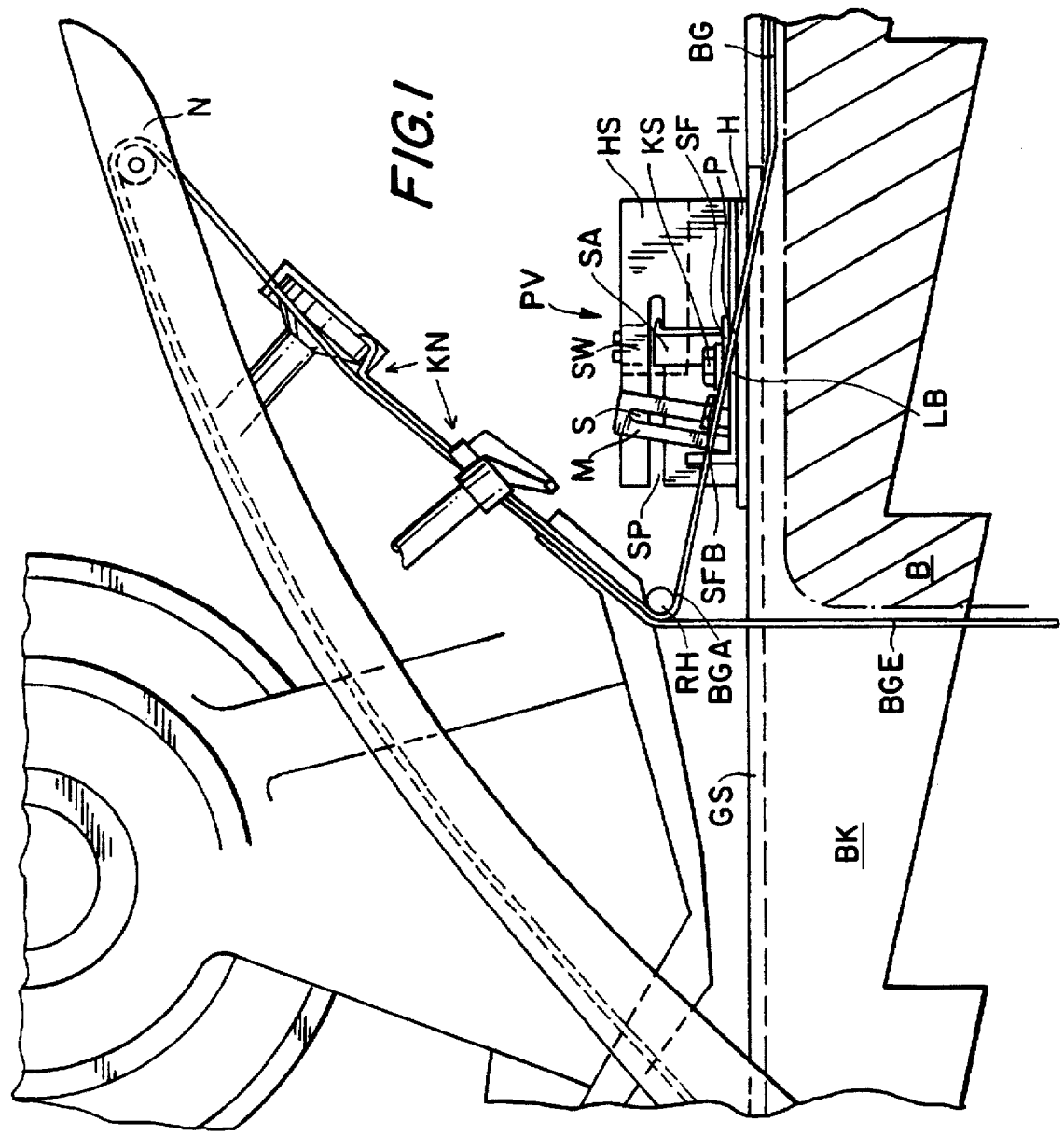
FIG. 1 is a side view of a testing device in accordance with the present invention before beginning of a knotting step in accordance with a first embodiment.

FIG. 1 shows a side view of a testing device in accordance with the present invention and which is identified as PV. It has a holder H which is mounted on a wall of a bale forming chamber BK near a housing gap GS. The passageways of the binding yarn of an initial portion of the loop BGA and an end portion of the binding yarn BGE of a binding yarn loop BG extend through the housing gap GS, while it is held in an knot maker KN. The loop BG runs around a newly formed bale B whose upper end region is shown in a broken line.

A turning plate P with a driver M and a switching arm SA is supported on the holder H turnably about a bearing pin LB. A spiral spring SF is mounted on the bearing pin LB with a clamping screw KS. It extends with one end through a guiding slot S of the driver M and from there also as the sensor finger SFB transversely through the housing gap GS.

In the shown working phase, the needle N of the end portion of the binding yarn BGE is located in the knot maker KN, where it is firmly held. Both ends of the loop BGA and BGE are located behind a holding pin RH, so that the end portion of the loop BGA slightly lifts the springy sensor finger SFB from below.

Figure 2:
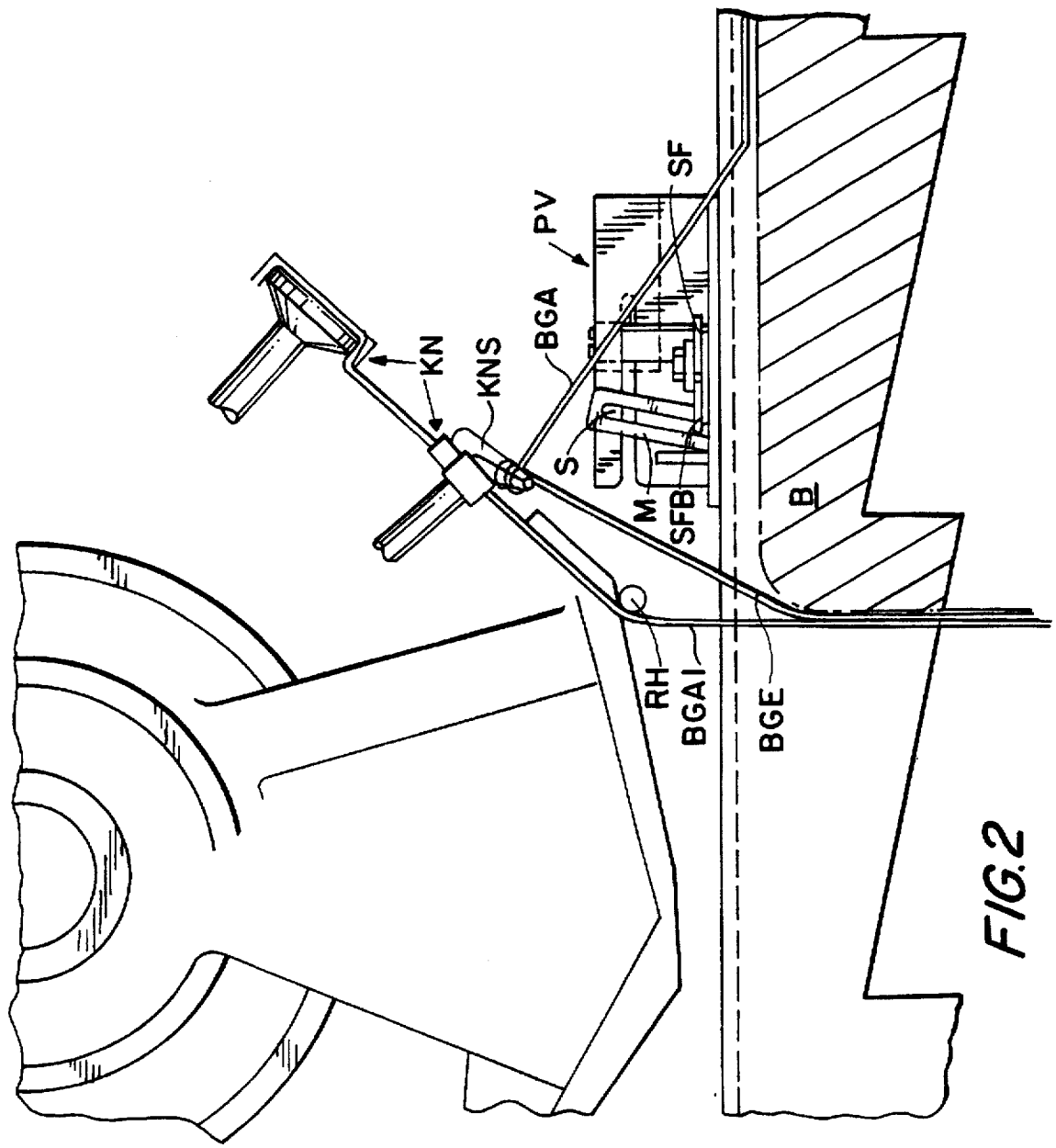
FIG. 2 is a side view corresponding to the view of FIG. 1 but during the knotting process.

FIG. 2 shows the next working phase in which the knot making nose KNS of the initial portion of the loop BGA is lifted from the holding pin RH, and therefore it further lifts the springy sensor finger SFB running in the guiding slot S until the initial portion of the loop BGA comes free in the shown position and the sensor finger SFB is sprung back to the basic position. Also, the end portion of the loop BGE is released from the holding pin RH and the initial portion of the loop BGA1 of the following loop is again held there. The sensor finger SFB is located inside the loop and passes through the path of the loop when the knot maker throws out the finally knotted loop.

It can be seen that the guiding slot S in the driver M is slightly inclined relative to the vertical plane. This course substantially corresponds to the way of the sensor finger SFB, so that friction is low. The guiding slot S is substantially closed at one side where the sensor finger passage takes place during its maximum deviation when the initial portion of the loop BGA is released.

Figure 3:
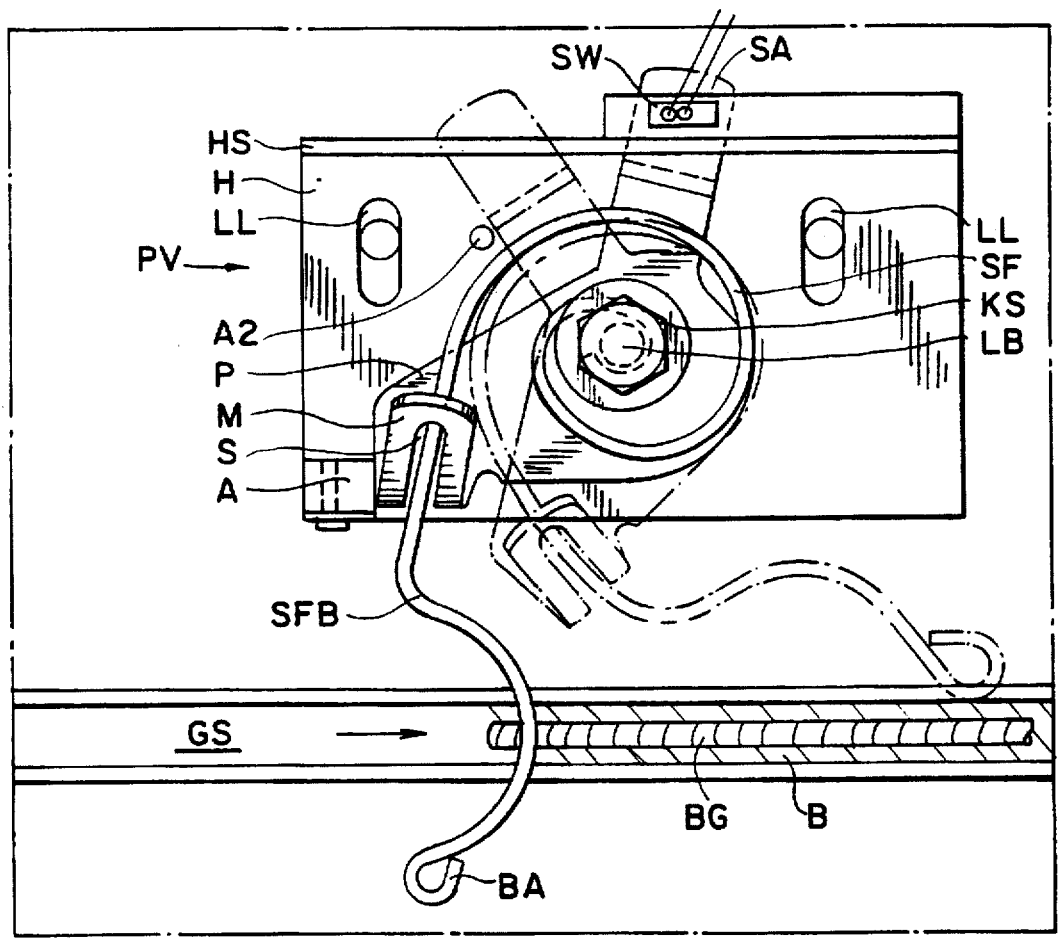
FIG. 3 is a view showing the inventive testing device after the end of knotting.

FIG. 3 shows on an enlarged scale, which substantially corresponds to the original dimensions, a view of the testing device PV directly after the discharge of the knot in said lines, and also shows the testing device DV in dash-dot lines in the turned end position of the turning plate P in which the further transported bale B directly pulls off the loop BG from the sensor finger SFB.

The driver M is located in its rest position on an elastic, damping abutment A which is mounted on the holder H and formed as a buffer. During turning, the sensor finger SFB takes the turning plate P over the driver M and thereby the switching arm SA of the switch SW is turned back so that its contact is switched over.

The spring SF is a spiral spring formed of round steel wire or high-elastic synthetic plastic wire. The inner end of the spring SF is mounted on the bearing pin LB of the turning plate P with a clamping screw KS. The other end of the spiral passes through the guiding slot S of the driver M and extends in a curve of approximately 2–3 cm radius over approximately 120° and ends in a backwardly bent ear BA.

It can be seen that the guiding slot S is inclined approximately by 10°–20° relative to the vertical plane similarly to the driver M inclined slightly rearwardly. This substantially corresponds to the course of the spring passage during upward turning, when the initial portion of the loop is pulled on the sensor finger SFB. The inclination of the driver M causes guidance of the loose loop during its falling on the sensor finger.

The holding plate H is angled and has a holding leg HS which carries the switch SW. Elongated holes LL are provided in the holder H for mounting and position adjustment relative to the housing gap GS.

The switch SW can be formed as a mechanically or electrically actuated galvanic contact switch, or as an electrical magnetic field sensor which is located in a magnetic field of a magnet. The magnet is deviated by the switching arm SA when it is located in the switching position.

Figure 4:
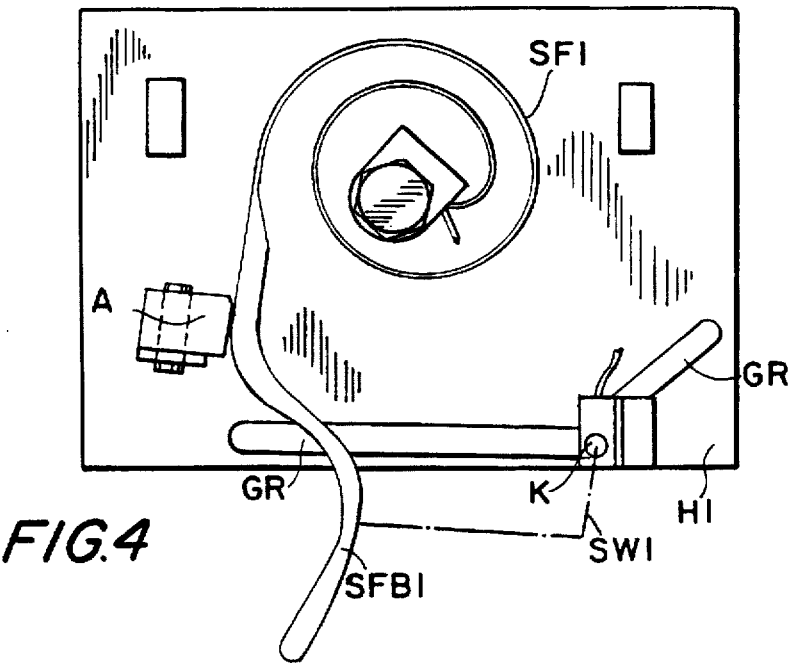
FIG. 4 is a view showing a testing device in accordance with a second embodiment of the invention.

FIG. 4 shows a second extremely simple embodiment of the testing device. In this device a spiral spring SF1 with a spiral interior is mounted on the holder H1. Moreover, a switching contact K of the switch SW1 is mounted in an insulating manner on the holder H1, and a sensor connecting conductor is guided on it. A central region of the electrically conductive spring located between the spiral and the sensor finger SFB1 serves as a counter contact. The contact surfaces of the sensor finger SFB1 and the switching contact K slightly engage one another, so that a cleaning action during running and a secure contact is guaranteed. In the movement region, the sensor finger SFB1 is supported on a rounded sliding ramp GR on the holder H1. During running on the sliding ramp, the contact K is slightly raised.

Preferably the spring is composed of a flat material and arranged with its wide side perpendicular to the spiral plane and then coiled by approximately 90° into an arc of the sensor finger SFB1. The flat material is formed somewhat spherical in the region in which it slides on the sliding ramp GR.

It is to be understood that a simple, galvanic contact can be replaced by a magnetic field sensor whose control magnetic field is deviated by the sensor finger. Preferably the spring is composed of steel or carries a magnetically conductive armature in the switching region.

Figure 5:
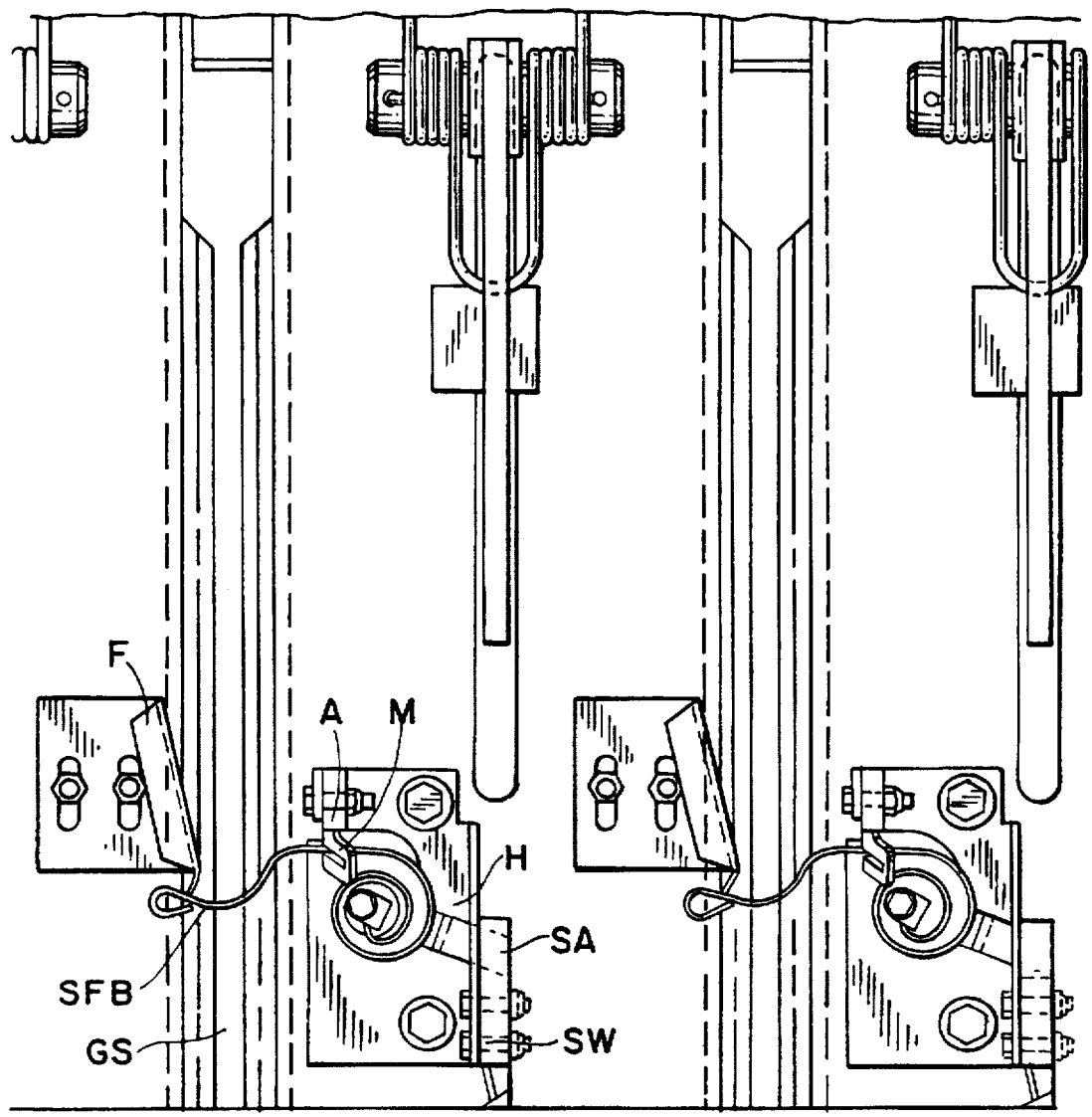
FIG. 5 is a view showing sensors provided in the testing device in accordance with the present invention.

FIG. 5 shows a section of a series arrangement of several testing devices. The spiral spring SF is arranged at one side of the housing gap GS, and a guiding wall which is inclined in a funnel-shaped manner and runs inclinedly on the sensor finger SFB is arranged at the other side. Its free end overlaps the guiding plate F substantially open 5–1 cm. and approximately contacts the same. It is thereby guaranteed that the loose loops during falling on the sensor finger SFB are guided and cannot run laterally.

The holding plate H and/or the guiding wall F are composed of metal plate or synthetic plastic. The switching arm SA is bent. It is loosely guided with its free bent end in a guiding gap SP of the holder H as shown in FIG. 1.

The individual testing device is a robust exchangeable structural assembly. The switching contact cooperates in a known manner with a transport command signal and an alarm device. When several knot makers are provided on a bale forming machine, then one testing device is associated with each of them and its signals are supplied together for the alarm generation. The advantage of a testing device, with a testing finger which tests the finished loops during a further transportation of the bale is that, both the knot and also the whole loop is tested under a pulling action as to the closed structure.

It will be understood that each of the elements described above, or two or more together, may also find a useful application in other types of constructions differing from the types described above.

While the invention has been illustrated and described as embodied in a testing device for bale tying, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A testing device for tying a yarn loop on an agricultural bale forming machine having a bale forming chamber, comprising a sensor finger extendable transversely into a first passageway of an initial portion of a loop before a first knotting step and also into a second passageway of a finished loop after the knotting step and holding the initial portion of the loop and the loop differently in different directions; an electrical switch movable to a switching-over position when said sensor finger is actuated so as to deviate by the loop because of a bale ejecting movement, said sensor finger is formed as an end region of a spring which holds a passage of the initial portion of the loop deviatingly and during deviation of said electrical switch is at least indirectly switchingly actuated by the loop.

2. A testing device as defined in claim 1; and further comprising a holder, said spring having an inner end held on said holder; and means for holding said inner end of said spring on said holder.

3. A testing device as defined in claim 2, wherein said holder is composed of a mounting plate having a bent holding leg on which said switch is mounted, said holder being provided with an elastic, damping abutment on which said spring is pressed in a force transmitting manner when it is not turned.

4. A testing device as defined in claim 3, wherein said holder is provided in said holding leg with a guiding slot, said switch having a switching arm with a bent end loosely guided in said guiding slot.

5. A testing device as defined in claim 2, wherein said holder is provided with elongated holes for a functionally correct position adjustment to the passageway of the loop and for mounting on a wall of the bale forming chamber.

6. A testing device as defined in claim 2, wherein said holder is composed of a material selected from the group consisting of a synthetic plastic and a metal sheet.

7. A testing device as defined in claim 2, wherein said means for holding said inner end on said holder includes a clamp.

8. A testing device as defined in claim 2, wherein said spring is formed as a coil spring.

9. A testing device as defined in claim 2, wherein said spring is formed as a spiral spring.

10. A testing device as defined in claim 1; and further comprising a turnable switching arm which actuates said switch; and a driver arranged so that said spring is connected with said turnable switching arm through said driver, and said spring, said driver and said switching arm form a one-piece element.

11. A testing device as defined in claim 10, wherein said holder is composed of a mounting plate having a bent holding leg on which said switch is mounted, said holder being provided with an elasting, damping abutment on which said driver is pressed by said spring in a force transmitting manner when it is not turned.

12. A testing device in claim 10; and further comprising a turning plate having a turning bearing, said switching arm and said driver being angularly formed on said turning plate.

13. A testing device as defined in claim 10, wherein said driver has a guiding slot, said spring having an outer end passing through said guiding slot and then extending as said sensor finger.

14. A testing device as defined in claim 13, wherein said spring is formed as spiral spring, said driver extending inclinedly substantially in a direction of bending of said spiral spring and follows said sensor finger during deviation so as to extend outwardly from a vertical position substantially over 15°, said guiding slot being laterally inclined substantially in the direction of bending of said spiral spring during deviation of said sensor finger to follow the same by substantially 10° relative to a vertical plane.

15. A testing device as defined in claim 13, wherein said guiding slot is formed so that it is closed at an end side, a position of said spring during deviation of said sensor finger.

16. A testing device as defined in claim 1, wherein said sensor finger is formed as an arc which is a part of a circle extending over substantially 120° and has an arc center located in a plane of the passageway of the loop and with a curved course extending in a switching turning direction, said arc having a radius of substantially 2–3 cm.

17. A testing device as defined in claim 1, wherein said spring is composed of a material selected from the group consisting of an elastic flat material, a round flat material, steel and a synthetic plastic.

18. A testing device as defined in claim 1, wherein said spring is arranged so that its free end is bent in an engaging direction of the loop to form a narrow ear.

19. A testing device as defined in claim 1, wherein said spring is composed of a flat material which extends in a spiral region in a width perpendicular to a spiral plane and extends in said sensor finger in a width substantially parallel to the spiral plane so as to be coiled between said spiral region and said sensor finger by 90°.

20. A testing device as defined in claim 1; and further comprising a holder, said switch has a contact which is mounted in an electrical insulating manner on said holder; and a sliding ramp arranged in a movement region of said sensor finger so as to slightly raise said contact so as to be pulled by the loop through the movement region as a result of a bale ejection movement.

21. A testing device as defined in claim 1, wherein said switch is formed so that said sensor finger is deviated in a controlled manner during passage of a movement region.

22. A testing device as defined in claim 1, wherein said switch has a switching arm and is formed so that said sensor finger is deviated in a controlled manner during passage of a movement region.

23. A testing device as defined in claim 1, wherein said switch is formed as a mechanically actuatable galvanic contact.

24. A testing device as defined in claim 1, wherein said switch is formed as a magnetically actuatable galvanic contact.

25. A testing device as defined in claim 1, wherein said switch is formed as an electric magnetic field sensor in a magnetic field.

26. A testing device as defined in claim 1; and further comprising a housing having a housing slot limited by a guiding wall, said sensor finger having a free end which in an initial position extending closely behind said guiding wall, said guiding wall being funnel shaped and inclined toward said sensor finger and guides a tying yarn loop to said sensor finger.

27. A testing device as defined in claim 26, wherein said guiding wall is composed of a material selected from the group consisting of a synthetic plastic and a metal sheet.

* * * * *